US007881284B2

(12) United States Patent
Lin et al.

(10) Patent No.: US 7,881,284 B2

(45) Date of Patent: Feb. 1, 2011

(54) METHOD AND APPARATUS FOR DYNAMICALLY ADJUSTING THE PLAYOUT DELAY OF AUDIO SIGNALS

(75) Inventors: Zhe-Hong Lin, Ping-Chen (TW); De-Hui Shiue, Hsinchu (TW); Yi-Wei Wu, Yun-Lin Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 1308 days.

(21) Appl. No.: 11/381,534

(22) Filed: May 4, 2006

(65) Prior Publication Data

US 2007/0211704 A1 Sep. 13, 2007

(30) Foreign Application Priority Data

Mar. 10, 2006 (TW) .............................. 95108133 A

(51) Int. Cl.
*H04L 12/66* (2006.01)

(52) U.S. Cl. ....................... 370/352; 370/351; 370/356; 370/516

(58) Field of Classification Search ................. 370/516, 370/351–356; 379/516
See application file for complete search history.

(56) References Cited

U.S. PATENT DOCUMENTS 6,360,271 B1 3/2002 Schuster et al. ............. 709/231
6,366,959 B1 * 4/2002 Sidhu et al. ................. 709/231
6,452,950 B1 9/2002 Ohlsson et al. ............. 370/516
6,504,838 B1 * 1/2003 Kwan ......................... 370/352
6,600,759 B1 7/2003 Wood ......................... 370/516
6,683,889 B1 * 1/2004 Shaffer et al. ............... 370/516
6,684,273 B2 * 1/2004 Boulandet et al. ............. 710/52
6,693,921 B1 2/2004 Whitfield ..................... 370/516
6,700,895 B1 3/2004 Kroll .......................... 370/412
6,747,999 B1 6/2004 Grosberg et al. ............ 370/516
7,110,357 B2 * 9/2006 Yao et al. .................... 370/230
7,346,005 B1 * 3/2008 Dowdal ...................... 370/252
7,359,324 B1 * 4/2008 Ouellette et al. ............ 370/230
7,596,488 B2 * 9/2009 Florencio et al. ............ 704/208
2002/0101885 A1 * 8/2002 Pogrebinsky et al. ....... 370/516
2004/0120309 A1 * 6/2004 Kurittu et al. ............... 370/352
2005/0047396 A1 * 3/2005 Helm et al. ................. 370/352
2006/0092918 A1 * 5/2006 Talalai ........................ 370/352
2007/0064679 A1 * 3/2007 Chitturi ...................... 370/352

FOREIGN PATENT DOCUMENTS

CA 2393489 A1 1/2003
JP 2001160826 A 6/2001
JP 2004080625 A 3/2004
TW 465209 B 11/2001

* cited by examiner

*Primary Examiner*—Nathan Flynn
*Assistant Examiner*—Khaled Kassim

(57) ABSTRACT

Disclosed is a method and apparatus for dynamically adjusting the playout delay for audio signals, which mainly includes three parts of dynamic adjustment, i.e., playout delay, silence length, and jitter buffer size. In the invention, the time for playout delay is real-time adjusted according to the probability distribution of the number of packets buffered in a jitter buffer. A voice active detection mechanism is taken to detect silence within a voice packet. By dynamically adjusting the silence length in the voice packets, the present invention reduces the network variation impact on the voice quality. It also overcomes the drawback of conventional techniques for estimating playout delay, and reduces the whole computation complexity of the playout delay for the voice packets.

6 Claims, 8 Drawing Sheets

METHOD AND APPARATUS FOR DYNAMICALLY ADJUSTING THE PLAYOUT DELAY OF AUDIO SIGNALS

FIELD OF THE INVENTION

The present invention generally relates to a real-time voice communication system, and more specifically to a method and apparatus for dynamically adjusting the playout delay of audio signals.

BACKGROUND OF THE INVENTION

As the Internet expands rapidly, the service of voice over IP (VoIP) is widely adopted. However, the network traffic conditions remain the most important factor for the voice quality of VoIP regardless of the compression techniques used. When the network latency varies, the packet containing the compressed voice data is delayed or even lost to reach the receiver end. For the VoIP application, the voice packet loss or out-of-order arrival will greatly affect the voice quality.

In the VoIP system, the arrival time of the voice packets will be jittered due to the network delay variation. The current use of jitter buffer is the most widely employed technique for solving this problem. By storing the received voice packets in the jitter buffer to delay the playout, the network impact will be reduced on the playout voice quality.

In the jitter buffer management mechanism, the delay length of the voice packets plays the key role in the voice quality. The current delayed playout designs are divided into two categories. The first is to use a fixed length (constant) delay in playout, and the second is to use an adjustable playout delay. FIG. 1 shows a schematic view of fixed playout delay. The small dots in the figure indicate the voice packets arriving at the receiving end. The x-axis is the arrival time in milliseconds (ms), and y-axis is the voice packet delay, that is, the transmission time of the voice packet in the network. The two horizontal lines in FIG. 1 are the 200 ms and 90 ms fixed playout delay, respectively.

As shown in FIG. 1, the drawback of the fixed playout delay is that when the fixed playout delay is too small, such as 90 ms, some voice packets will arrive too late to be played back. This can be solved by a longer fixed playout delay. However, a longer fixed playout delay, such as 200 ms, will cause the degradation of the voice communication quality.

The advantage of the fixed playout delay is the low computation complexity in the implementation, while the drawback is that it does not reflect the actual network conditions. Once the network is congested and the jitter buffer is overflow, the communication will be cut off.

To solve the aforementioned drawback, related researches were conducted to develop adjustable playout delay techniques so that the delay can be adjustable in accordance with the network conditions by adjusting the jitter buffer size. A plurality of techniques are disclosed in related patents, including U.S. Pat. No. 6,360,271, U.S. Pat. No. 6,600,759, U.S. Pat. No. 6,693,921, U.S. Pat. No. 6,452,950, U.S. Pat. No. 6,700,895, U.S. Pat. No. 6,684,273, U.S. Pat. No. 6,683,889 and U.S. Pat. No. 6,747,999.

U.S. Pat. No. 6,360,271 disclosed a "system for dynamic jitter buffer management based on synchronized clocks" to use a global positioning system (GPS) to synchronize the clock. By arranging the playout delay for each voice packet, the patent provides a dynamic jitter buffer management mechanism.

U.S. Pat. No. 6,600,759 disclosed an apparatus using a hardware element for estimating jitter in the voice packets over a network. The network follows the TCP/IP protocol.

U.S. Pat. No. 6,700,895 disclosed a method for determining the optimal jitter buffer size based on the data packet loss in a real-time communication system.

U.S. Pat. No. 6,683,889 disclosed a method for automatically adjusting the jitter buffer size. The method determines the jitter buffer size by comparing the packet delay and a default value.

However, the estimation of the network delay remains difficult. The conventional techniques use the time stamp on the voice packet to compute the network delay, which may also be affected by the clock rate discrepancy between the transmitting and receiving ends. Therefore, the sampling rate and the communication may not be synchronized. The sampling rate discrepancy may be a result of the hardware at the transmission and receiving ends. For example, the voice sampling is configured to be 8 KHz. The software is based on 8 KHz to encode and decode the voice signals. However, if the hardware devices at both ends are not exactly setting at 8 KHz, the error will occur.

The aforementioned techniques fail to effectively solve the problem of estimating the voice packet playout delay. Some techniques require extra hardware element for implementation, while others do not support silence adjustment to adjust the playout time. However, the voice packet playout delay is the key to the quality.

SUMMARY OF THE INVENTION

The present invention has been made to overcome the above-mentioned drawback of conventional methods. The primary object of the present invention is to provide a method and apparatus for dynamically adjusting the playout delay of audio signals to reduce the impact of the network delay variation on the voice quality and improve the voice smoothness.

The method for dynamically adjusting the playout delay of audio signals of the present invention includes three dynamic adjustment parts: (a) dynamic adjustment of playout delay, (b) dynamic adjustment of the silence length, and (c) dynamic adjustment of jitter buffer zone. The best time for the (a) dynamic adjustment of playout delay is during the silence. The silence length in (b) is determined by the number of the voice packets in the jitter buffer. The zone size in (c) depends on the number of the voice packets in the jitter buffer.

According to the present invention, the playout delay is adjusted in real time in accordance with the distribution of the number of the voice packets in the jitter buffer. A voice active detection (VAD) mechanism is used at the receiving end to detect the silence in the voice packets. By adjusting the silence length in the voice packets to change the playout delay, the impact of the network variation on the voice quality is reduced.

The jitter buffer is divided into a few different zones by three boundaries. The three boundaries are the lower bound of normal delay, the upper bound of normal delay and the maximum acceptable delay. The maximum acceptable delay is the maximum delay that is acceptable during the voice conversation.

When the amount of the voice packets in jitter buffer exceeds the maximum acceptable delay, the jitter buffer discards the voice packets beyond the boundary. When the amount of the voice packets in jitter buffer is between the maximum acceptable delay and the upper bound of normal delay, it indicates the amount of voice packets in the jitter buffer is too large but still within the storage limit. The VAD is activated to detect the silence in the voice packets and shrink the silence length to reduce the playout delay. If the amount of the voice packets in the jitter buffer is between upper bound of normal delay and the lower bound of normal delay, it indicates the amount of the voice packets in the jitter buffer is within the acceptable range. When the amount of the voice packets in the jitter buffer is lower than the lower bound of normal delay, it indicates the amount of the voice packets in the jitter buffer is too small but there remain voice packets for playout. The VAD is activated to detect the silence in the voice packets and extend the silence length to increase the playout delay.

Other than the condition when the amount of voice packets in the jitter buffer is between the upper bound of normal delay and lower bound of normal delay, all the voice packets are processed before they are played out. The best scenario is that all the voice packets can be played out without processing, that is, without adjusting the silence length. To achieve the object, the present invention adjusts the zone size according to the distribution of the probabilities of the voice packet amount that falls within the zones. Through a probability model to estimate the network variation and an algorithm for adjusting the zones, the zones can be automatically adjusted according to the network conditions.

Therefore, the apparatus using the method of the present invention includes a jitter buffer, a dynamic playback delay adjustment module, a dynamic silence length adjustment module, and a dynamic jitter buffer zone adjustment module. The jitter buffer further includes an extended silence zone, a normal delay range zone, and a shrink silence zone. The dynamic jitter buffer zone adjustment module further includes a probability model estimation unit and a zone size adjustment module.

The present invention reduces the probability for processing voice packets before playout so that the quality of the voice is better ensured and the amount of total computation is reduced.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

In a packet-switched network environment, the audio signal is encoded into a sequence of packets. Through the network, the voice packets transmit from a transmitting end to a receiving end. After the voice packets arrived at the receiving end, the method and apparatus of the present invention is used to perform the dynamic adjustment of playout delay, silence length and the jitter buffer zone.

Figure 1:
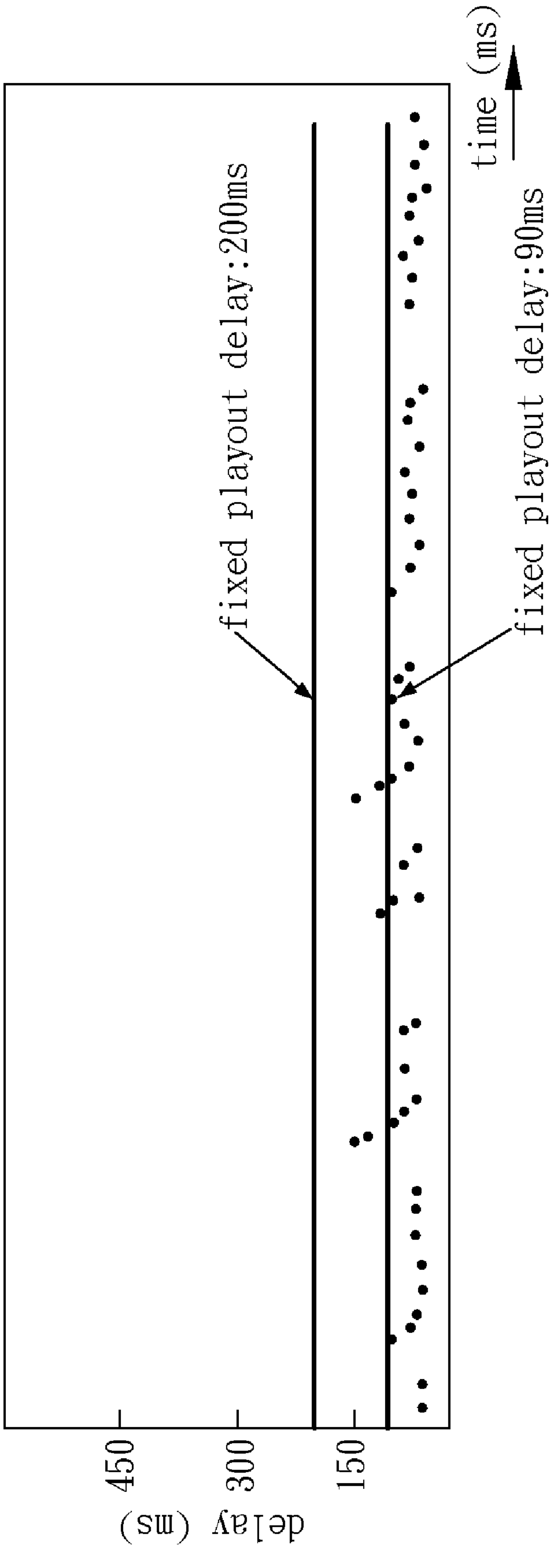
FIG. 1 (Prior Art)
FIG. 1 shows a schematic view of the fixed playout delay.
Figure 2:
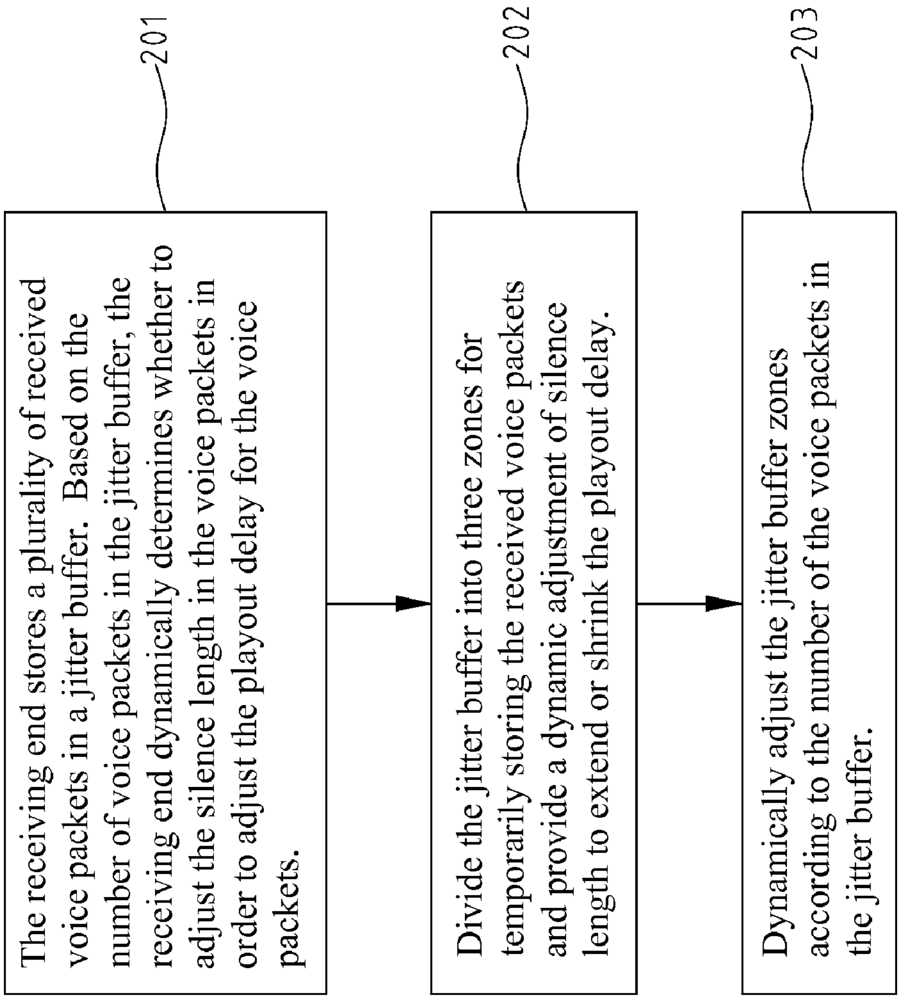
FIG. 2 shows a flowchart of a method for dynamically adjusting the playout delay of audio signals of the present invention.

FIG. 2 shows a flowchart illustrating the method for dynamically adjusting the playout delay of audio signals according to the present invention. As shown in FIG. 2, the receiving end stores a plurality of received voice packets in a jitter buffer. Based on the number of voice packets in the jitter buffer, the receiving end dynamically determines whether to adjust the silence length in the voice packets in order to adjust the playout delay for the voice packets, as shown in step 201. This is because the human hearing is less sensitive to the changes in the silence. The silence of the voice packets can be detected by a voice active detection (VAD) mechanism.

Step 202 is to divide the jitter buffer into three zones for temporarily storing the received voice packets and provide a dynamic adjustment of silence length to extend or shrink the playout delay. The silence length is determined according to the number of the voice packets in the jitter buffer. Step 203 is to dynamically adjust the jitter buffer zones.

According to the three steps in the flowchart of FIG. 2, the probability of processing the voice signals can be reduced so that the voice quality is better ensured and the overall computation is also reduced.

Figure 3:
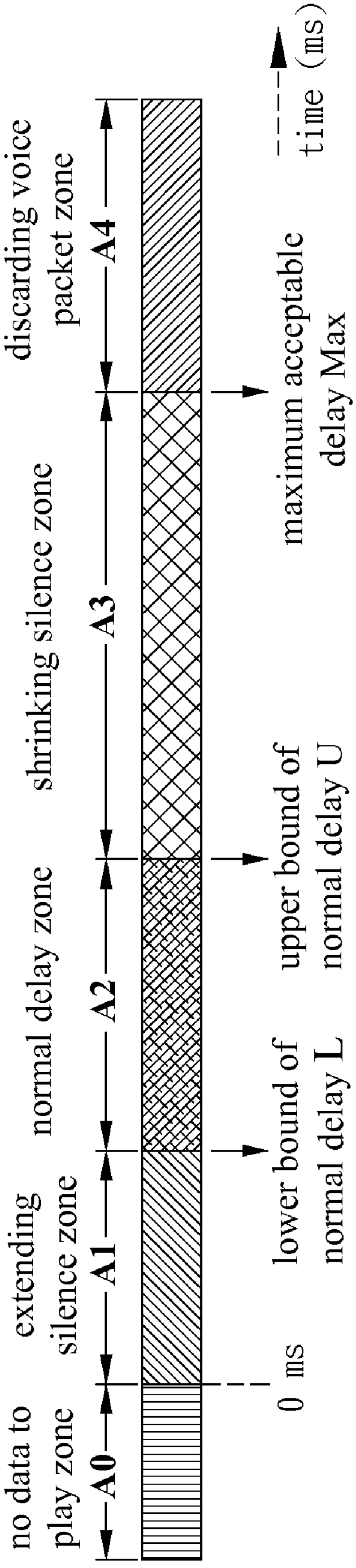
FIG. 3 shows the zones and the processing required for each zone according to the present invention.

FIG. 3 shows the zones of the jitter buffer and the processing of each zone. The jitter buffer is divided into three zones. As shown in FIG. 3, zones A1-A3 of the jitter buffer are based on the lower bound of normal delay (L), the upper bound of normal delay (U) and the maximum acceptable delay (Max). Max is the maximum delay that is acceptable in the voice communication.

When the number of voice packets in the jitter buffer exceeds Max, the jitter buffer discards the voice packets beyond Max, as indicated by zone A4 of FIG. 3. When the number of the voice packets in the jitter buffer is between Max and U, it indicates the number of the voice packets in the jitter buffer is too many, but remains within the storage limit of the jitter buffer. In this scenario, the voice active detection (VAD) mechanism is activated to detect the silence of the voice packets and shrink the silence length to reduce the playout delay. When the number of the voice packets in the jitter buffer is between U and L, it indicates the number of the voice packets in the jitter buffer is within the acceptable range, and no further processing is required. When the number of the voice packets in the jitter buffer is less than L, it indicates the number of the voice packets in the jitter buffer is too few, but there remain voice packets for playout. In this scenario, the VAD is activated to detect the silence in the voice packets and extend the silence to increase the playout delay.

When the network starts to get congested, the duration between the voice packet arrivals at the receiving end increases. The number of voice packets in the jitter buffer decreases. If the network congestion continues, the jitter buffer will become empty and the voice communication is interrupted. In this scenario, it indicates that the number of the voice packets in the jitter buffer is less than L, as shown in FIG. 3. To prevent the jitter buffer from becoming empty, the VAD mechanism detects the silence in the voice packets and extends the silence to increase the playout delay until the number of the voice packets in the jitter buffer returns to the normal delay range, i.e., between U and L. If the voice packets are still all played out after the extending of the silence, the receiving end has no data to play, shown as zone A0 in FIG. 3.

On the other hand, if the network congestion disappears and the arriving duration between voice packets at the receiving end is shrunk, the number of the voice packets in the jitter buffer increases. Once the number of the voice packets in the jitter buffer exceeds Max, the voice packets beyond Max will be discarded. This will lead to the loss of part of the conversation. This is shown in FIG. 3 as when the number of the voice packets in the jitter buffer is between Max and U, the VAD mechanism must detect the silence in the voice packets and shrink the silence to decrease the playout delay until the number of the voice packets in the jitter buffer returns to the normal delay range, i.e., between U and L.

Figure 4A:
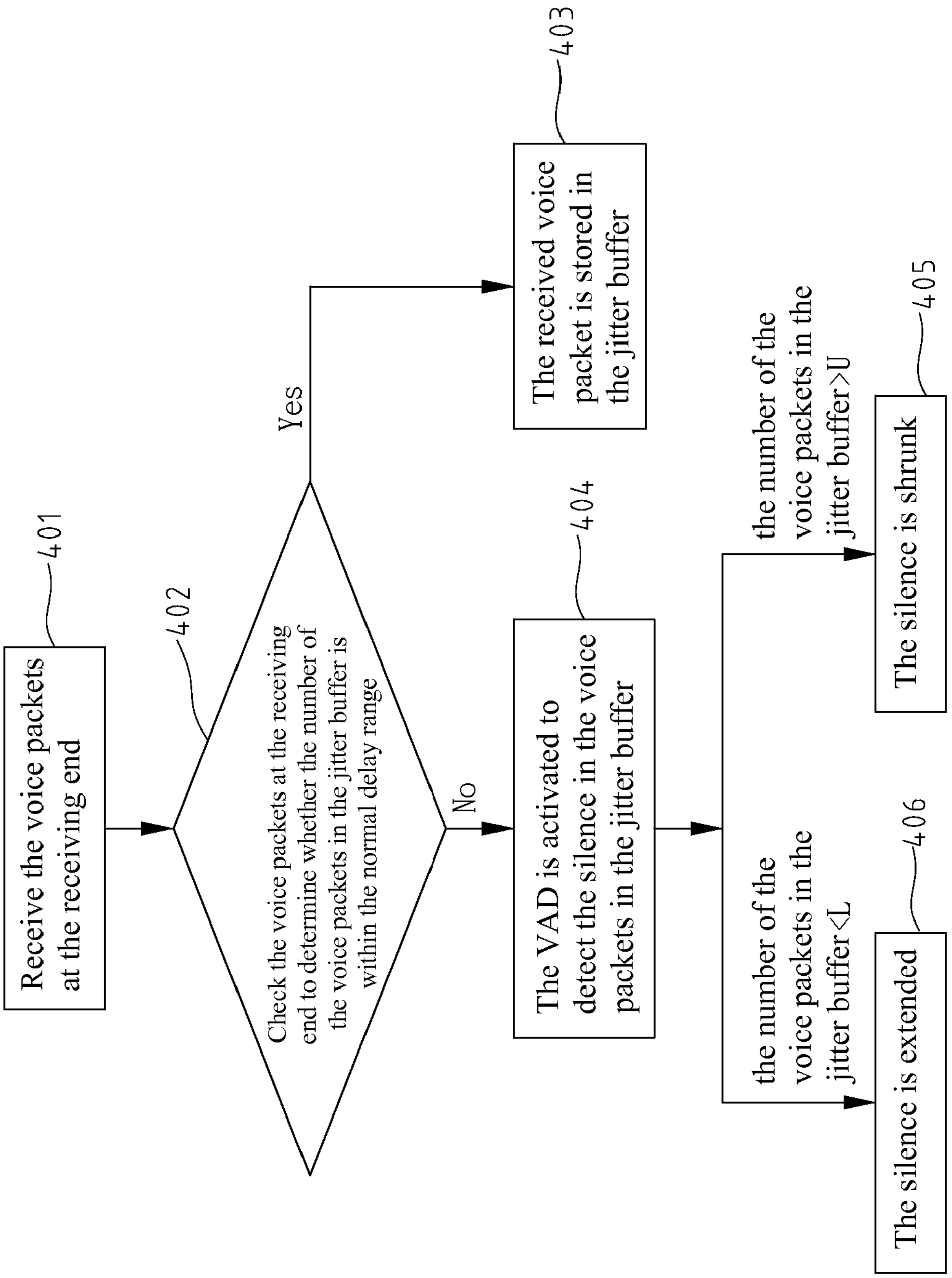
FIG. 4A shows a flowchart of the silence adjustment of the present invention, in which the amount of voice packets in the jitter buffer is computed using the number of the voice packets.

FIG. 4A shows the flowchart of the silence length adjustment, all measured in the number of the voice packets in the jitter buffer. As shown in FIG. 4A, step 401 is to receive the voice packets at the receiving end, and step 402 is to check the voice packets at the receiving end to determine whether the number of the voice packets in the jitter buffer is within the normal delay range. If so, the received voice packets are stored in the jitter buffer, as step 403; otherwise, the VAD is activated to detect the silence in the voice packets in the jitter buffer, as step 404. When the number of the voice packets in the jitter buffer exceeds U, the silence is shrunk, as step 405. When the number of the voice packets in the jitter buffer is below L, the silence is extended, as step 406.

Figure 4B:
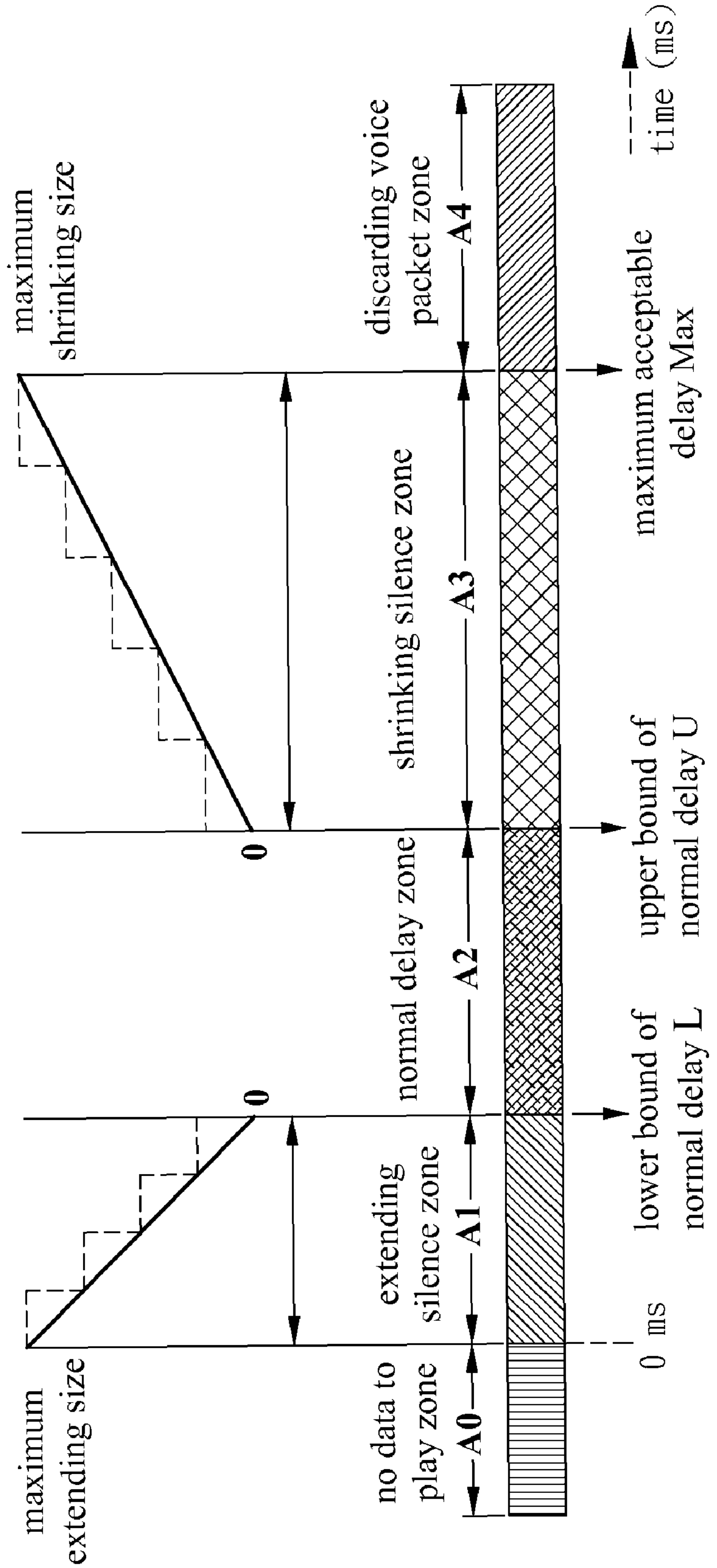
FIG. 4B shows the silence adjustment, the maximum of silence extension, and the maximum of silence shrinkage.

FIG. 4B shows the silence adjustment, and the sizes of the maximum shrinking and maximum extending. According to the present invention, the maximum extending size and the maximum shrinking size are determined by the lowest voice quality that is acceptable to the user.

It is worth noticing that the size of silence adjustment is according to the number of the voice packets in the jitter buffer. FIG. 4B also shows the silence adjustment. When the number of the voice packets in the jitter buffer decreases and moves further away from L, it indicates the jitter buffer is becoming empty. The silence length must be extended. When the number of the voice packets in the jitter buffer moves closer to L it indicates the network congestion is alleviated, and the silence length must be extended with a less amount of extension.

Similarly, when the number of the voice packets in the jitter buffer increases and moves further away from U, the same adjustment mechanism is used for shrinking the silence length. The adjustment size of the silence can be determined by a function, such as linear function, step function, or an exponential-like function.

Although the variable playout delay provides better voice quality, as described earlier, the conventional techniques use time stamps in the voice packets to compute the network delay, which may lead to errors. This is because clocks on the transmitting end and the receiving end may not be synchronized; therefore, sampling rates and the time on both ends are not synchronized. To improve the voice quality and reduce the overall computation, the present invention provides dynamic adjustment of jitter buffer zones. The zone size can be changed according to the network congestion conditions.

Except when the number of the voice packets in the jitter buffer is within the range U and L, all the voice packets must be processed before playback. The processing of voice packets will cause the degradation of the voice quality. Therefore, it is to the best interest of the voice quality to maintain the number of the voice packets in the jitter buffer within U and L so that no processing and silence adjustment are required. To achieve this object, the present invention provides a method to dynamically adjust the jitter buffer zones according to the number of the voice packets in the jitter buffer. Through the probability model to estimate the network saturations, the present invention can automatically adjust the jitter buffer zones.

The object of the zone size adjustment is to keep the number of the voice packets in the jitter buffer to stay within U and L to reduce the probability that the voice packets need to be processed before playbout.

Figure 5:
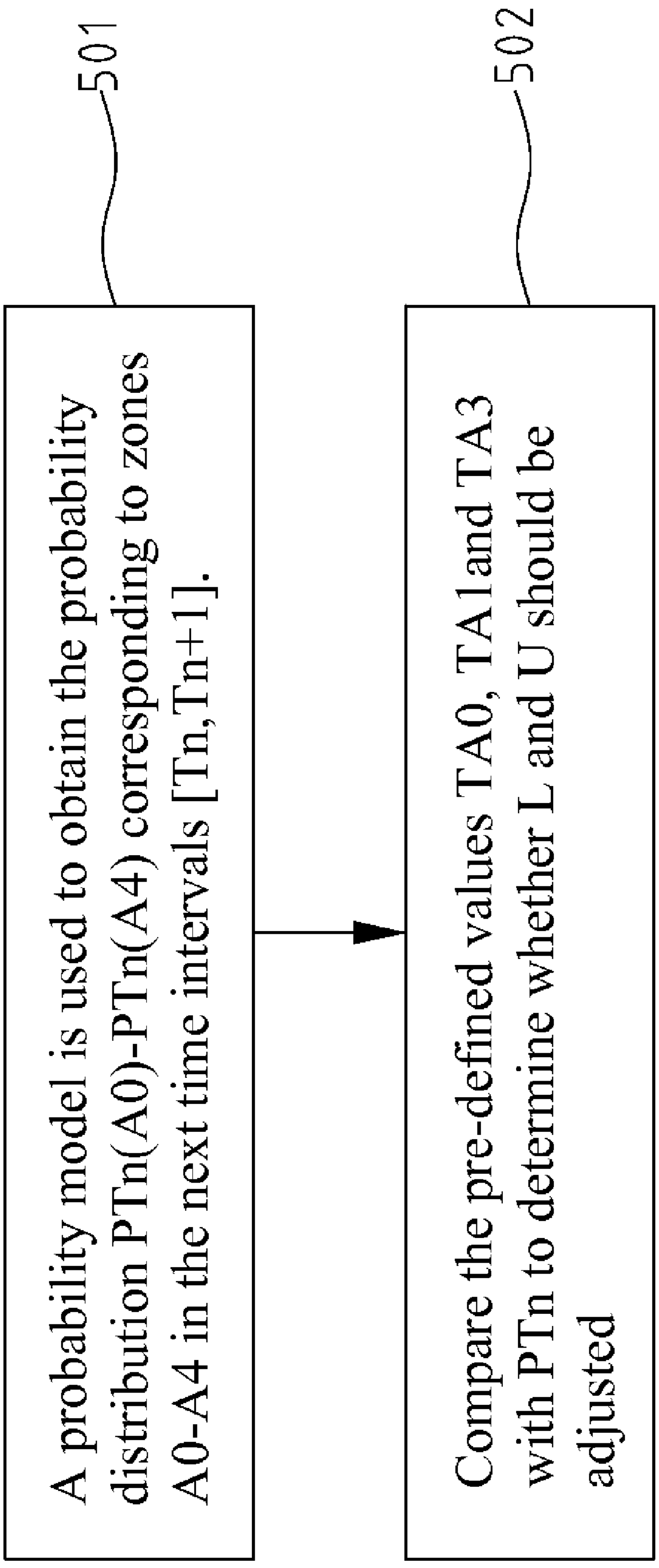
FIG. 5 shows a flowchart of adjusting U and L according to the present invention.

FIG. 5 shows the flowchart of adjusting U and L. As shown in FIG. 5, a probability model is used to obtain the probability distribution $P_{Tn}$(A0)-$P_{Tn}$(A4) corresponding to zones A0-A4 in the next time intervals $[T_n, T_{n+1}]$, as step 501. The probability model is described as follows.

Let $P_{T0}$ (Ai) be the initial value of zone Ai, and $P_{T0}$(A0)=$P_{T0}$(A1)=$P_{T0}$(A2)=$P_{T0}$(A3)=$P_{T0}$(A4)=1/5, where i=0-4. $P_{Tn-1,Tn}$(Ai) represents the probability that the number of the voice packets in the jitter buffer falls in zone Ai in the time interval $[T_{n-1}, T_n]$. According to $P_{Tn-1,Tn}$(Ai) and previous $P_{Tn-1}$(Ai), it is possible to predict $P_{Tn}$(Ai), the probability that the number of the voice packets in the jitter buffer falls in zone Ai in the time interval $[T_n, T_{n+1}]$. In other words, the computation is:

$$P_{Tn}(Ai)=P_{Tn-1,Tn}(Ai)\times\alpha+P_{Tn-1}(Ai)\times(1-\alpha),\ i=0\sim4,$$

where α is used to determine the sensitivity of $P_{Tn}$(Ai) to the network jitter, and sum of all the $P_{Tn}$(Ai) must be equal to 1, that is:

$$\sum_{i=0}^{4} P_{Tn}(Ai) = 1.$$

Figure 6:
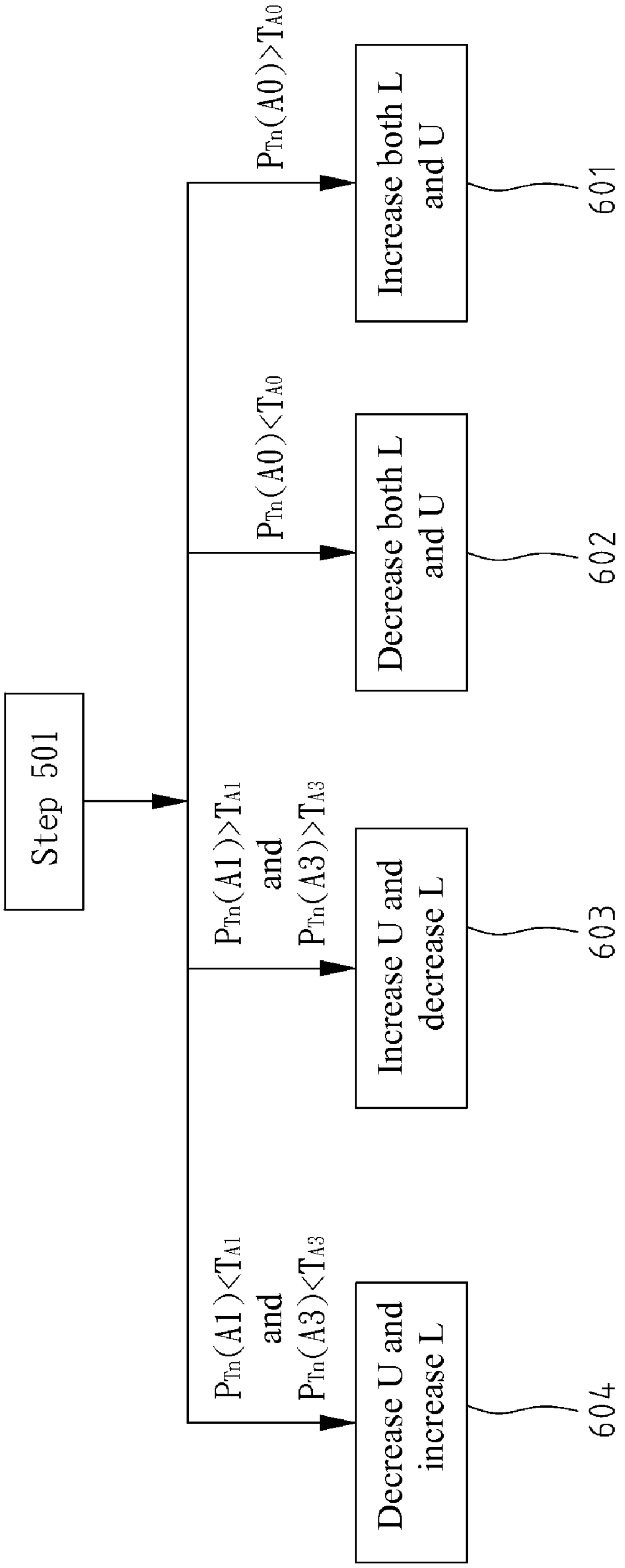
FIG. 6 shows the four scenarios of U and L adjustment according to the present invention.

Then, the pre-defined values $T_{A0}$, $T_{A1}$ and $T_{A3}$ are compared with $P_{Tn}$. The result of the comparison is used to determine whether L and U should be adjusted, as step 502. If no adjustment is required, n is incremented and the method returns to step 501. Otherwise, U and L are adjusted, n is incremented and the method returns to step 501. There are four scenarios for the U and L adjustment: both U and L increased, U increased and L decreased, U decrease and L increased, and both U and L decreased. FIG. 6 will describe the four scenarios respectively.

Refer to FIG. 6, the first scenarios is that when $P_{Tn}$(A0)>$T_{A0}$, the indication is that the number of the voice packets in the jitter buffer decreases; therefore, the number must be increased. By increasing both U and L, as step 601, the voice packets have more probability to extend the silence. The second scenarios is that when $P_{Tn}$(A0)<$T_{A0}$, the indication is that the number of the voice packets in the jitter buffer increases; therefore, the number must be decreased. By decreasing both U and L, as step 602, the voice packets have more probability to shrink the silence. The third scenario is that when $P_{Tn}$(A1)>$T_{A1}$ and $P_{Tn}$(A3)>$T_{A3}$, the indication is that the network jitter increases; therefore, U must be increased and L must be decreased, as step 603. The fourth scenario is that when $P_{Tn}$(A1)<$T_{A1}$ and $P_{Tn}$(A3)<$T_{A3}$, the indication is that the network jitter decreases; therefore, U must be decreased and L must be increased, as step 604.

As described, the present invention uses a probability model to estimate the network conditions (jitter), and an algorithm to compute L and U of the jitter buffer so that the zones in the jitter buffer can be dynamically adjusted according to the network conditions. This achieves the object to increase the probability that the number of the voice packets in the jitter buffer will fall in the range of U and L.

Figure 7:
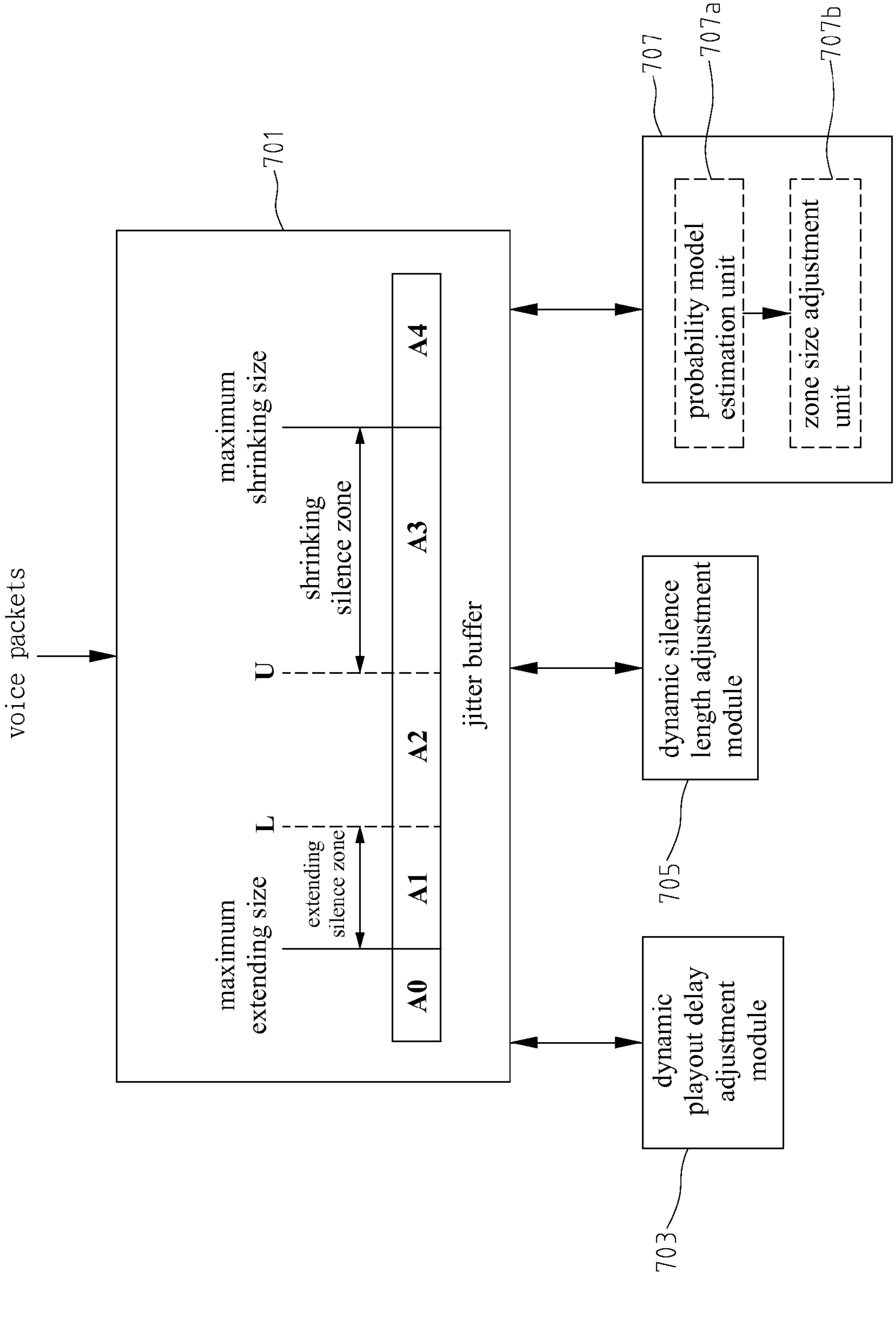
FIG. 7 shows a schematic view of the block diagram of the apparatus for dynamically adjusting the playout delay of audio signals according to the present invention.

FIG. 7 shows a schematic view of a block diagram of an apparatus of the present invention. The apparatus 100 for dynamically adjusting the playout delay includes a jitter buffer 701, a dynamic playout delay adjustment module 703, a dynamic silence length adjustment module 705, and a dynamic jitter buffer zone adjustment module 707.

Jitter buffer 701 temporarily stores a plurality of received voice packets, and delays and re-orders the playout time of the voice packets. Dynamic playout delay adjustment module 703 divides jitter buffer 701 into three zones, and dynamically extends or shrinks the silence length of the voice packets to adjust the playout delay of the voice packets. Dynamic silence length adjustment module 705 dynamically adjusts, according to the number of the voice packets in jitter buffer 701, the shrinking or extending size of the silence length. Dynamic jitter buffer zone adjustment module 707 dynamically adjusts, according to the number of the voice packets in jitter buffer 701, the sizes of the three zones of jitter buffer 701.

As described earlier in FIG. 3, the jitter buffer includes an extended silence zone A1, a normal delay zone A2, and a shrinking silence zone A3. Extended silence zone A1 includes a maximum extending size, and shrinking silence zone A3 includes a maximum shrinking size. The two sizes are determined by the lowest quality that is acceptable to the user, and the silence of the voice packets can be detected by the VAD mechanism.

FIGS. 5-6 describe the zone adjustment of the jitter buffer. A probability model is used to estimate the network jitter and an algorithm is used to compute L and U of the jitter buffer.

Dynamic jitter buffer zone adjustment module 707 further includes a probability model estimation unit 707*a* and a zone size adjustment unit 707*b*. Probability model estimation unit 707*a* obtains the probability distribution $P_{Tn-1},\ _{Tn}$ corresponding to the previous time interval $[T_{n-1},T_n]$ of zone A0-A4, and combines $P_{Tn-1}$ to predict $P_{Tn}$(Ai) corresponding to probability that the number of the voice packets in the jitter buffer falls into the range Ai in the next time intervals $[T_n, T_{n+1}]$. Zone size adjustment unit 707*b* compares $T_{A0}$, $T_{A1}$ and $T_{A3}$, $P_{Tn}$(Ai) to determine whether to increase or decrease U and L of zone A2.

In summary, the present invention provides a method and apparatus for dynamically adjusting playout delay of audio signals. The zones in the jitter buffer are adjusted according to the distribution of the number of voice packets. Through a probability model to estimate the network variation and an algorithm for adjusting the zones, the zones can be automatically adjusted according to the network conditions. The impact of the voice quality caused by the network jitter is reduced, and the smoothness of the voice is increased. The present invention reduces the probability of processing the voice signals so that the voice quality is better ensured and the overall computation is also reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for dynamically adjusting playout delay of audio signals encoded into a sequence of voice packets and transmitted from a transmitting end through a packet-switched network to a receiving end, said method comprising the steps of:

storing a plurality of said voice packets in a jitter buffer at said receiving end, and dynamically determining whether to adjust silence length in said voice packets based on the number of said voice packets in said jitter buffer in order to adjust said playout delay;

dividing said jitter buffer into three zones for temporarily storing said voice packets, and providing dynamic adjustment of silence length to extend or shrink said playout delay; and dynamically adjusting the sizes of said three zones of said jitter buffer according to the number of said voice packets in said jitter buffer;

wherein said step of dynamically adjusting the sizes of said three zones further comprises the steps of:

mapping said jitter buffer into five zones according to the number of said voice packets in said jitter buffer, said five zones including a no data to play zone A0, an extending silence zone A1, a normal delay zone A2, a shrinking silence zone A3, and a discarding voice packet zone A4, thereby said jitter buffer being divided into said zone A1, said zone A2, and said zone A3 with said zone A2 having a lower bound of normal delay L and an upper bound of normal delay U;

using a probability model to obtain $P_{Tn}$(Ai) of said zone Ai over a next time interval [Tn,Tn+1], said $P_{Tn}$(Ai) being the probability that the number of said voice packets in said jitter buffer falls into said zone Ai in the time interval [Tn,Tn+1], i being an integer number from 0 to 4 and n being a natural number; and comparing pre-defined values $T_{A0}$, $T_{A1}$ and $T_{A3}$, with said probability $P_{Tn}$(A0), $P_{Tn}$(A1), and $P_{Tn}$(A3) to determine whether to adjust said upper bound of normal delay U and said lower bound of normal delay L.

2. The method as claimed in claim 1, wherein said upper bound of normal delay U and said lower bound of normal delay L are adjusted according to the steps of:

increasing both said upper bound of normal delay U and said lower bound of normal delay L when $P_{Tn}$(A0) is greater than $T_{A0}$;

decreasing both said upper bound of normal delay U and said lower bound of normal delay L when $P_{Tn}$(A0) is less than $T_{A0}$;

increasing said upper bound of normal delay U and decreasing said lower bound of normal delay L when $P_{Tn}$(A1) is greater than $T_{A1}$ and $P_{Tn}$(A3) is greater than $T_{A3}$; and decreasing said upper bound of normal delay U and increasing said lower bound of normal delay L when $P_{Tn}$(A1) is less than $T_{A1}$ and $P_{Tn}$(A3) is less than $T_{A3}$.

3. The method as claimed in claim 2, wherein said $P_{Tn}$(Ai) is computed using the steps of:

initializing $P_{T0}$(Ai) for said zone Ai;

predicting $P_{Tn}$(Ai) using previous $P_{Tn-1}$(Ai) and $P_{Tn-1,Tn}$(Ai), said $P_{Tn-1,Tn}$(Ai) being the probability that the number of said voice packets in said jitter buffer falls into said zone Ai in a time interval [Tn−1,Tn]; and computing $P_{Tn}$(Ai) as $$P_{Tn}(Ai)=P_{Tn-1,Tn}(Ai)\times\alpha+P_{Tn-1}(Ai)\times(1-\alpha),$$

wherein α is a parameter used to determine sensitivity of $P_{Tn}$(Ai) to network jitter, and $P_{Tn}$(A0)+$P_{Tn}$(A1)+$P_{Tn}$(A2)+$P_{Tn}$(A3)+$P_{Tn}$(A4)=1.

4. An apparatus used in a packet-switched network for dynamically adjusting playout delay of audio signals, comprising:

a jitter buffer for temporarily storing a plurality of received voice packets, and delaying and re-ordering playout time of said voice packets;

a dynamic playout delay adjustment module for dividing said jitter buffer into three zones, and dynamically extending or shrinking silence length of said voice packets to adjust said playout delay of said voice packets according to the number of said voice packets in said jitter buffer;

a dynamic silence length adjustment module for dynamically adjusting a shrinking size or an extending size of said silence length according to the number of said voice packets in said jitter buffer; and a dynamic jitter buffer zone adjustment module for dynamically adjusting the sizes of said three zones of said jitter buffer according to the number of said voice packets in said jitter buffer;

wherein at least one of said jitter buffer, said dynamic playout delay adjustment module, said dynamic silence length adjustment module and said dynamic jitter buffer zone adjustment module in said apparatus is a hardware module, and said jitter buffer is mapped into an extending silence zone A1 in which the number of said voice packets in said jitter buffer is below a lower bound of normal delay L, a normal delay zone A2 in which the number of said voice packets in said jitter buffer is in a normal range between said lower bound of normal delay L and an upper bound of normal delay U, and a shrinking silence zone A3 in which the number of said voice packets in said jitter buffer is above said upper bound of normal delay U; when said jitter buffer contains no voice packets for playout, said jitter buffer falls into a no data to play zone A0; and when said jitter buffer contains more voice packets for playout than a maximum acceptable delay Max, said jitter buffer falls into a discarding voice packet zone A4.

5. The apparatus as claimed in claim 4, wherein said extending silence zone A1 has a maximum extending size in extending said silence length, said shrinking silence zone A3 has a maximum shrinking size in shrinking said silence length.

6. The apparatus as claimed in claim 4, wherein said dynamic jitter buffer zone adjustment module further comprises:

a probability model estimation unit for predicting the probability that the number of said voice packets in said jitter buffer falls into zone Ai in a next time interval $[T_n, T_{n+1}]$, with i being an integer from 0 to 4 and n being a natural number; and a zone size adjustment unit for determining whether to increase or decrease said lower bound of normal delay L or said upper bound of normal delay U of said normal delay zone A2.

* * * * *